(12) United States Patent
Gove, Jr. et al.

(10) Patent No.: US 11,487,538 B1
(45) Date of Patent: Nov. 1, 2022

(54) SOFTWARE REPOSITORY RECOMMENDATION ENGINE

(71) Applicant: Two Six Labs, LLC, Arlington, VA (US)

(72) Inventors: Robert P. Gove, Jr., Reston, VA (US); Casey Aaron Haber, San Francisco, CA (US)

(73) Assignee: Two Six Labs, LLC, Arlington, VA (US)

( * ) Notice: Subject to any disclaimer, the term of this patent is extended or adjusted under 35 U.S.C. 154(b) by 0 days.

(21) Appl. No.: 17/152,891

(22) Filed: Jan. 20, 2021

(51) Int. Cl.
*G06F 8/77* (2018.01)
*G06F 8/73* (2018.01)
*G06F 8/71* (2018.01)
G06Q 10/06 (2012.01)

(52) U.S. Cl.
CPC ............. *G06F 8/77* (2013.01); *G06F 8/71* (2013.01); *G06F 8/73* (2013.01); G06Q 10/06398 (2013.01)

(58) Field of Classification Search
USPC .......................................................... 717/123
See application file for complete search history.

(56) References Cited

U.S. PATENT DOCUMENTS

| 10,282,176 | B2* | 5/2019 | Maya | G06F 11/3409 |
| 2013/0111447 | A1* | 5/2013 | Amano | G06F 11/3676 717/124 |
| 2016/0274893 | A1* | 9/2016 | Thomas | G06F 8/71 |

* cited by examiner

Primary Examiner — John Q Chavis
(74) Attorney, Agent, or Firm — Armis IP Law, LLC

(57) ABSTRACT

A software library recommendation engine provides an analysis and aggregate dashboard comparison of metrics denoting maintainability trends in a plurality of libraries from a publicly available software repository. Maintainability trends include regularity and magnitude of changes (commits), resolution of user inquiries for issues, problems and bugs, and an estimation of core contributors for estimating inertia and longevity of a plurality of candidate libraries under consideration for a particular usage. Usage metrics coalesce and summarize usage data of libraries under consideration for comparison, and a dashboard of computed metrics provides an indication of trends that indicate reliability or longevity to mitigate vulnerability of the library user from dependence on the collaborative intent of the library author and contributors.

20 Claims, 8 Drawing Sheets

SOFTWARE REPOSITORY RECOMMENDATION ENGINE

STATEMENT REGARDING FEDERALLY SPONSORED RESEARCH AND DEVELOPMENT

This invention was made, at least in part, with government support under Contract No. FA8750-16-C-0160. The Government has certain rights in the invention.

BACKGROUND

Computer software was at one time primarily authored by the user of the software. Scientists and engineers wrote programs for their own use, and there was little need or concern for formalizing aspects such as revisions, compatibility, issue reports, and/or "bug" fixes, as they are often referred to. Modern software development presents a stark contrast, as once computers became feasible as a business and personal tool, software development matured and evolved as a parallel industry. Software is developed on a larger scale for an entire pool of users, and development and usage are distinct efforts.

Aspects of mass production, having evolved from conventional manufacturing industries, evolved into software development. Code libraries, which codify basic, repeatable sub functions and operations, evolved as modules or "pieces" included as part of a larger software program, package or suite. Much the way a plumber does not fabricate pipes and junctions, but rather assembles an implementation by joining and integrating basic functional elements, modern software development often involves libraries of code that provide more basic, general functions or operations. The libraries are invoked for integration in a larger program or application for avoiding redundant effort in implementing known or repeatable operations.

Software developers regularly choose open source libraries to help write a larger body of application code quickly and easily. Many public domain libraries are available as "freeware" or "shareware," underscoring a sense of cooperation and goodwill within the industry. Such libraries are easily accessible via a public access network such as the Internet and other public domain sources, and often present multiple implementation options for software development.

SUMMARY

Software developers have a plethora of open source libraries available for incorporation and usage within a larger application. A software library recommendation engine accesses available libraries for fulfilling a certain purpose or function, gathers and stores metrics pertaining to longevity, compatibility and reliability, and analyzes these metrics for predicting or assessing suitability for incorporation in a target application, program or project. Aggregation of this analysis for a plurality of libraries under consideration provides a dashboard view for comparing suitability criteria for a given project, and provides conclusory information for mitigating reliance on an underperforming open source library.

Configurations herein are based, in part, on the observation that modern computer software is often an agglomeration of multiple software technologies, or bodies of software, integrated, linked or invoked to operate as a cohesive application. While open-source libraries can be an attractive component due to cost, reliance on such libraries can inject additional risk since there is no proprietary or fee-for-services arrangement that imposes a duty on the software vendor or provider. Unfortunately, therefore, conventional approaches to open-source or public domain libraries leave the user with little assurance of stability, maintenance or compatibility for the intended use, and little recourse if a larger application is dependent on such an open-source software (OSS) library.

Accordingly, configurations herein substantially overcome the above shortcomings of OSS library usage by providing an analysis and aggregate dashboard comparison of metrics denoting maintainability trends in a plurality of libraries. Maintainability trends include regularity and magnitude of changes (commits), resolution of user inquiries for issues, problems and bugs, and an estimation of core contributors for estimating inertia and longevity of a plurality of candidate OSS libraries under consideration for a particular usage. Usage metrics coalesce and summarize usage data of libraries under consideration for comparison, and a dashboard of computed metrics provides an indication of trends that indicate reliability or longevity to mitigate vulnerability of the OSS library user from dependence on the collaborative intent of the OSS library author.

In further detail, a method for identifying a reliability of a software library as defined herein include identifying a package in a commonly available software repository, the package defining an interface to a library of available executable modules based on an application programming interface (API), and gathering, from a catalog of received developer inputs and changes to the package, recorded events about the package. A recommendation engine computes, based on the recorded events, a reliability value indicative of a subsequent reliability of the executable modules in the package, and rendering the computed reliability value or values for consideration in which library to incorporate or invoke.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, an example of network device for interrogating software libraries and storing usage metrics performs an analysis on the stored metrics for providing a recommendation of which candidate libraries are best suited for a task. A software program, application, or suite refers to a body of code that seeks to invoke a software library. A software library is a package of a separate body of code that is capable of interaction with the software program by inclusion or invocation by way of source code aggregation, linking or object module referencing, or otherwise transfers control of program execution to the code of the software library. Software libraries include OSS libraries which differ merely by their terms of usage, but which are otherwise technically similar to proprietary, or software obtained via paid license, royalty or outright purchase. Typically, OSS libraries are utilized at the source code level, which allows for modification by the user, however are compiled, linked and loaded into a memory coupled to an executing processor to operate as executable programs. The software libraries include sequences of code or instructions, arranged in collections of modules, routines, procedures, operations or functions, each having an entry point for invoking (commencing) execution for performing the desired outcome, and typically define an application programming interface (API) for access by another program.

Figure 1:
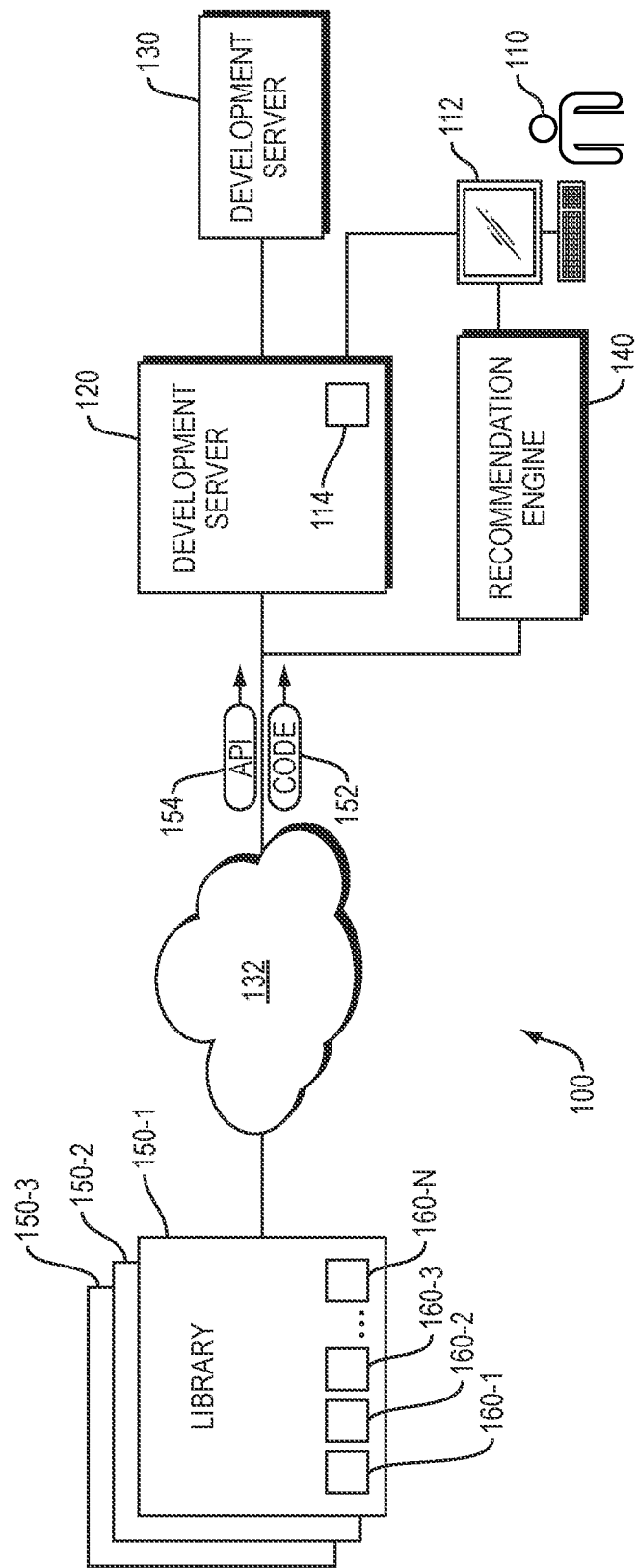
FIG. 1 is a context diagram of a software development environment suitable for use with configurations herein.

FIG. 1 is a context diagram of a software development environment suitable for use with configurations herein. Referring to FIG. 1, in a software development environment 100, one or more developers 110 employ an interface device 112, such as a laptop, desktop or similar alphanumeric input and rendering device for interaction with a development server 120. Depending on a scale of a software product under development 114, the development server may be suited by the storage and processor available on the interface device 112, or may entail a large number of developers collaborating on a common development host such as AWS® (Amazon Web Services) or GOOGLE®. Whatever the manner and scope of development, upon completion and testing, the software product is intended to be transferred to a deployment system 130, typically a customer executing the developed product or application.

Often, development efforts include accessing one or more OSS libraries 150-1 . . . 150-3 (150 generally) over a public access network (network) 132 such as the Internet. Usage of the OSS libraries 150 involves packages defined by source code 152 and/or an Application Programming Interface (API) 154 downloaded or exported from the library 150 for use in the product under development 114. In a typical library context, the package takes the form of a plurality of source code modules 160-1 . . . 160-N (160 generally), such that each source code module of the plurality of source code modules is stored in a renderable file indicative of instructions defined therein, and each source code module of the plurality of source code modules is responsive to modifications introduced by a developer. The use of a source code representation facilitates subsequent modification by the user/developer, however other forms, such as compiled object code or executable code (generally not human readable) may be extracted from the library 150 if accessible.

A recommendation engine 140 interrogates and queries a plurality of available libraries 160 for gathering recorded events about the modules contained in each of the libraries. In the case of a larger scale product under development 114 or longer-term projects, it is beneficial to seek open source libraries that will not present a risk during the product lifetime. A library 150 might be a risk because parts of it are incompatible with your product roadmap, or the authors cease maintaining the library. Some risks, like poor documentation, are easy to assess, however other risks relating to library maintenance are more difficult to pin down.

For example, many OSS libraries are hosted using GIT®, a popular OSS repository. GITHUB® is a parallel repository that stores usage statistics of git. A manual review of these statistics might hint at longer term issues, but such data is not centralized and cannot be easily ascertained. Details such as a data of file changes (commits), identity of contributors responsible for commits, and a rate of commits and corresponding issues (reported problems or anomalies) over time are difficult to identify, let alone coalesce into a risk assessment.

Figure 2:
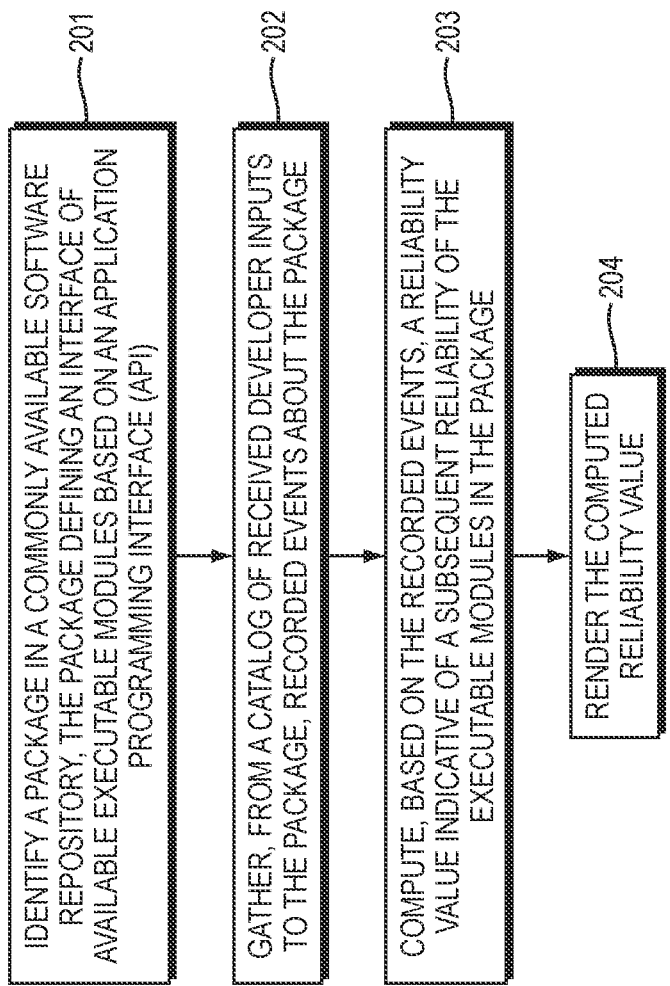
FIG. 2 is a flowchart of library selection from a software repository as in FIG. 1 using configurations herein.

FIG. 2 is a flowchart of library selection from a software repository as in FIG. 1 using configurations herein. Referring to FIGS. 1 and 2, a method for identifying a reliability of a software library 150 in a software repository includes identifying a package in a commonly available software repository, as depicted at step 201, such that the package defines an interface of available executable modules 160 in the library based on an application programming interface (API), and gathering, from a catalog of received developer inputs to the package, recorded events about the package, as disclosed at step 202. A recommendation engine 140 computes, based on the recorded events, a reliability value indicative of a subsequent reliability of the executable modules in the package, as depicted at step 203, and renders the computed reliability value, as shown at step 204.

Figure 3:
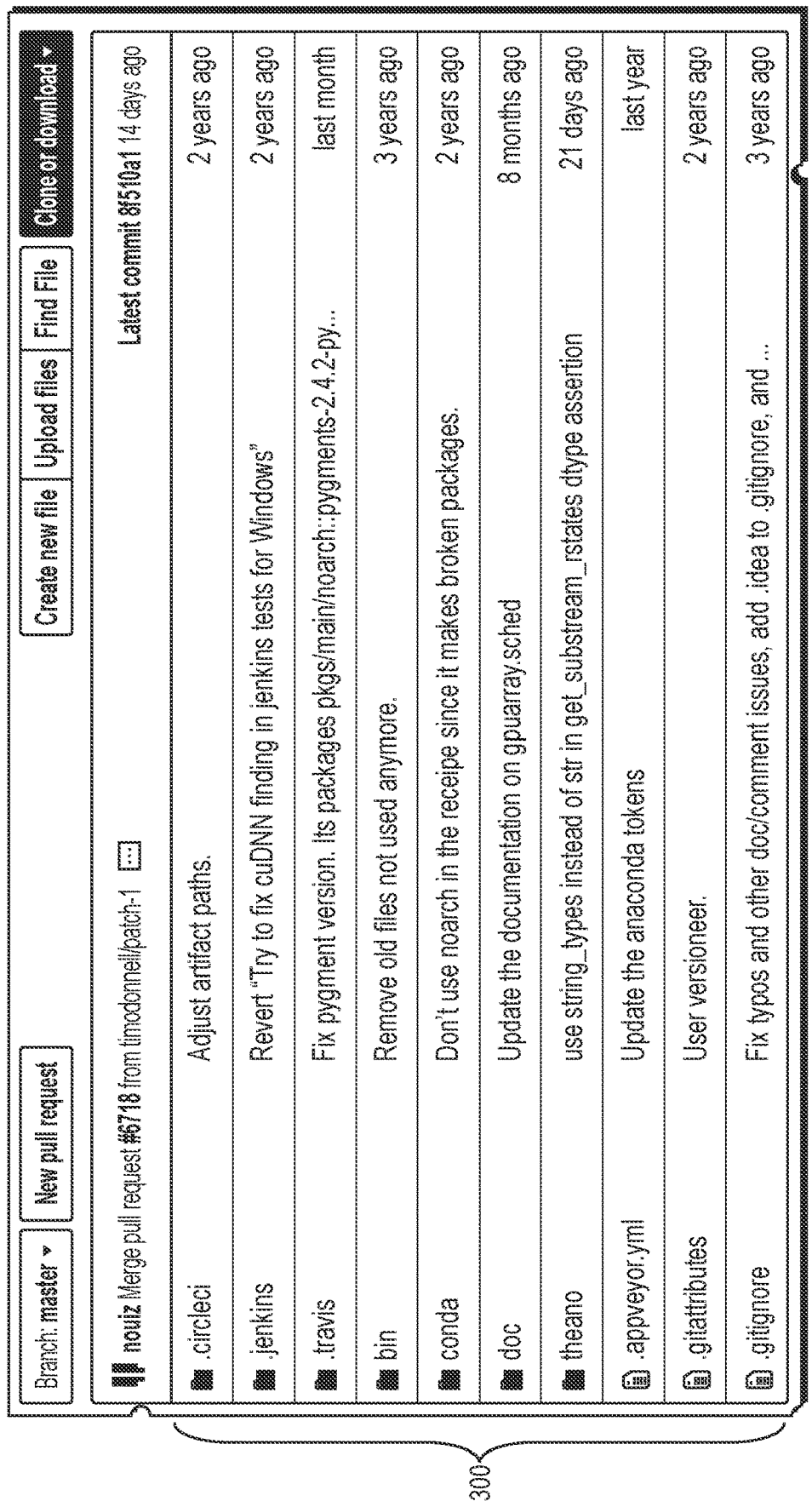
FIG. 3 is a rendering of a Prior Art software library selection.

FIG. 3 is a rendering of a Prior Art software library selection. Referring to FIG. 3, a display 300 of an example library from github is shown. Files or elements 310 are listed in no particular order, and show "commits," 312 or changes to files along with a date 314. Other prior art facilities allow rudimentary displays of commits made by particular developers. There is no vehicle for identifying a trend of modifications or support, or a lack of the same. It would be beneficial to develop a device, database and application for gathering and coalescing usage statistics, history and sequence of changes and actors that may be extracted, stored and processed to provide a rendering of collective and aggregate trends in how a library is changed, used and supported to provide a prediction of stability going forward.

Figure 4:
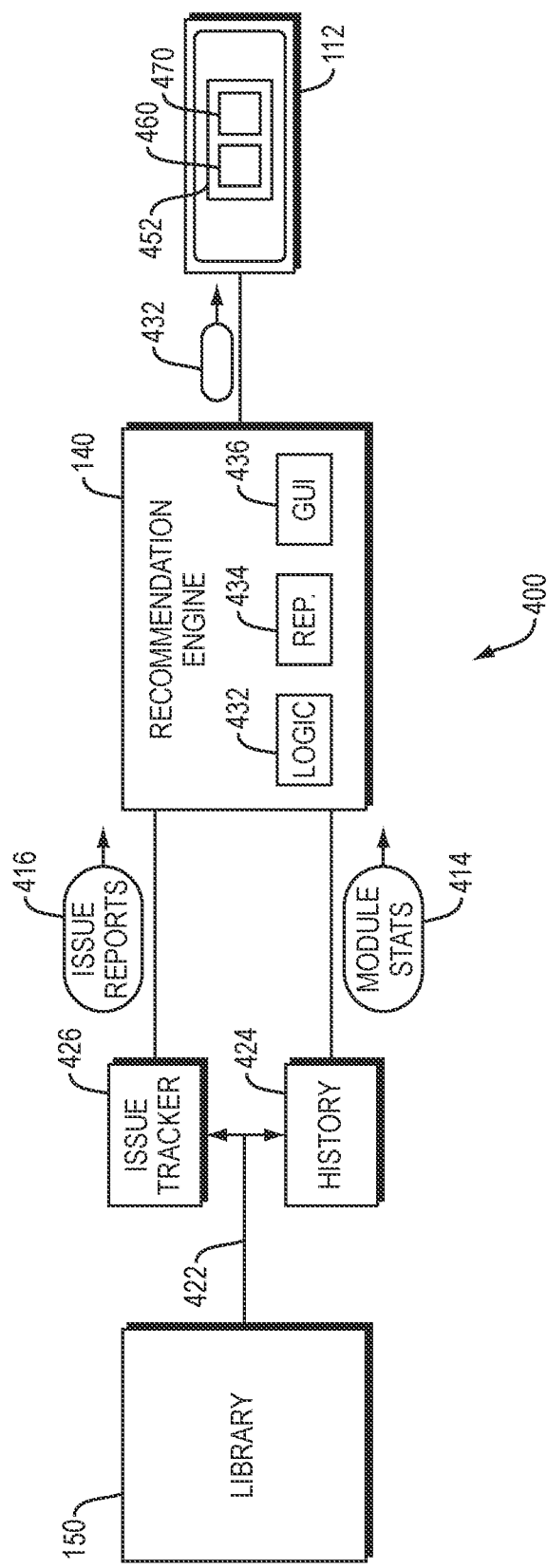
FIG. 4 is a data flow diagram for generation of software library recommendations.

FIG. 4 is a data flow diagram for generation of software library recommendations. Referring to FIGS. 1 and 4, a recommendation engine and visualization system 400 is configured to gain insight into the usage suitability risks of a single software library 150, and to compare multiple software libraries to assess their relative risks. The recommendations are rendered via dashboards that include semantic tags for code, commits over time, total vs. closed issues, and changes in the core contributors over time.

Software repositories such as git include a plurality of libraries 150-1 . . . 150-N (150 generally) to allow developers to consider and incorporate modules of those libraries as part of a larger development effort. A data pipeline 422 ingests, processes, and stores data in a history database 424 and an issues database 426 for each repository 410. A recommendation engine 430 interfaces with the databases 424 and 426 for receiving module statistics 414 and issue reports 416, and generating recommendations and supporting data. The recommendation engine 430 sends recommendation reports 432 to the frontend Graphical User Interface (GUI) device 112 for rendering a dashboard view 452 of recommendation.

For example, in a particular configuration, the data pipeline 422 fetches data from the given code repository's master branch using git commands, and the data pipeline fetches the GitHub issues using the GitHub API (Application Programming Interface). In the course of evolution of a library, different contributors modify modules (files) of the library over time, and users of the library make inquiries that identify issues 416, which are typically resolved by contributors to the library. In general, the recorded events about a library include a time and at least one of commits, developer identity, reports of operational anomalies, and closure of operational anomalies. The recommendation engine includes analysis logic 432 for traversing the databases 424 and 426 to generate recommendations 470, a report generator 434 for coalescing the analysis with recommendations about a plurality of libraries, and a GUI generator 436 for sending the recommendation to the dashboard view 452. The dashboard view 452 shows computed recommendations 470 along with supporting components 460 gathered from the module statistics 414 and issue reports 416 from the respective databases 424, 426.

Figure 5:
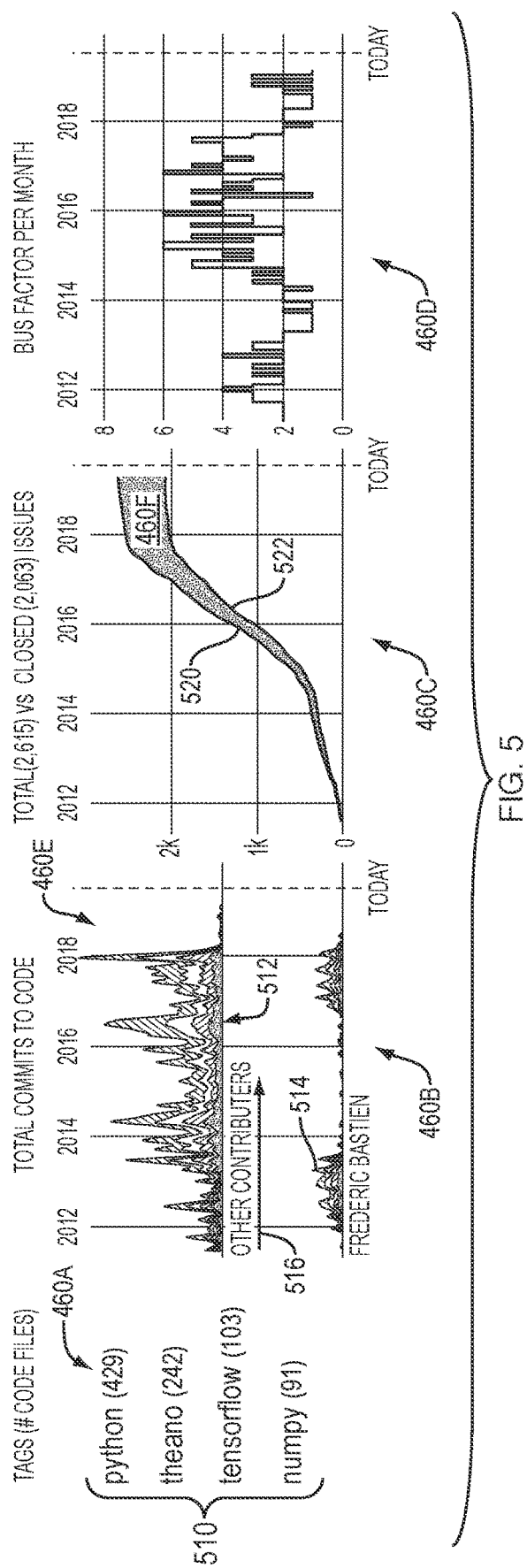
FIG. 5 shows metrics pertaining to a software library resulting from the data flow of FIG. 4.

FIG. 5 shows metrics pertaining to a software library resulting from the data flow of FIG. 4. Each library is a cohesive unit, or package of software typically including many modules (files), but which are interdependent to a degree and constitute distinct revisions as complete, discrete agglomerations of files. Each revision is defined by a commit, which represents changes to one or more of the files. Recorded events as maintained in the history 424 database include a sequence of commit requests, such that each commit request corresponds to a modification to the package (library). Each commit request is made by a developer responsible for the modifications. The recorded events from the issues database 426 include a sequence of reported issues 416 based on the package, in which the reported issues are received from a developer and indicative of an operational anomaly of the package. The recorded events from the history database 424 include a version history of the module statistics 414 of modules in the library. The version history identifies a sequence of versions of the package, such that each version of the sequence of versions defines a state of each file in the files in the package at a corresponding time denoted by the version. In other words, the version is a snapshot of the files at a point defined by the commit. The version history is based on the sequence of commit requests, such that each commit request is defined by a modification to one or more files in the package.

From the events, a tags component 460A shows automatically generated tags for the repository's files. The backend generates tags using a model for tagging the source code files in the library 150. The component 460A presents the most common tags as well as the number of code files per tag. This provides insight into what is in the library and what technologies the library uses. Tags are based on features such as a source language of a particular module, or other functions, libraries or identifiers derived from the code.

The commits include one or more tags, such that each tags defines a property of an executable modules affected by the commits. The rendered components include an indication of tags common to a plurality of the executable modules or the source code thereof. A ranking 510 of the indicated tags indicates a frequency of occurrence. For example, a python tag is most commonly occurring, indicating that much of the source code is written in python. A total commits component 460B visually presents the number of commits and the commit count over time on axis 516. A shading of the tag name corresponds to a shading 460E of the graph 512 of tags over time. A darker rendering (i.e. python) has the darkest shading, corresponding to the darkest shaded region of the graph 512. Thus, the area charts show commits over time from the top committer, and all the other contributors combined. A developer graph 514 shows a breakdown of the developer responsible for the highest number of the commits, used as an indication of significant contributors discussed below. The shading ties to the tags component and shows how commit content has changed over time 516.

A total vs. closed Issues component 460C displays the number of total issues and closed issues, also known as a burndown chart. This identifies how well the project's maintainers keep up with bugs and requests. An area 460F shows a number of open issues at a given time. A curve 520 for issues received exhibits a "S" shape, and is trailed by an issues closed curve 522. Generally, an "S" curve depicts a maturing library, as initial issues are low as the library commences dissemination, and increases as a library gains popularity but increased use results in additional issues (anomalies, bugs, errors, and the like). After a period of initial deployment, emerging issues are exhausted, and the issue closures 522 tend to catch up. A wide gap in the area 460F means a number of outstanding issues, and if occurring as the curve levels off, may mean that the library is not adequately supported. Similarly, a library that has low issues but has not yet started an upward curve may not have found substantial anomalies yet.

A significant developer count component 460D, colloquially known as a "bus factor," shows a number of committers (developers performing commits) who authored the majority of the commits. This gives a sense how many contributors are doing most of the work.

Figure 7:
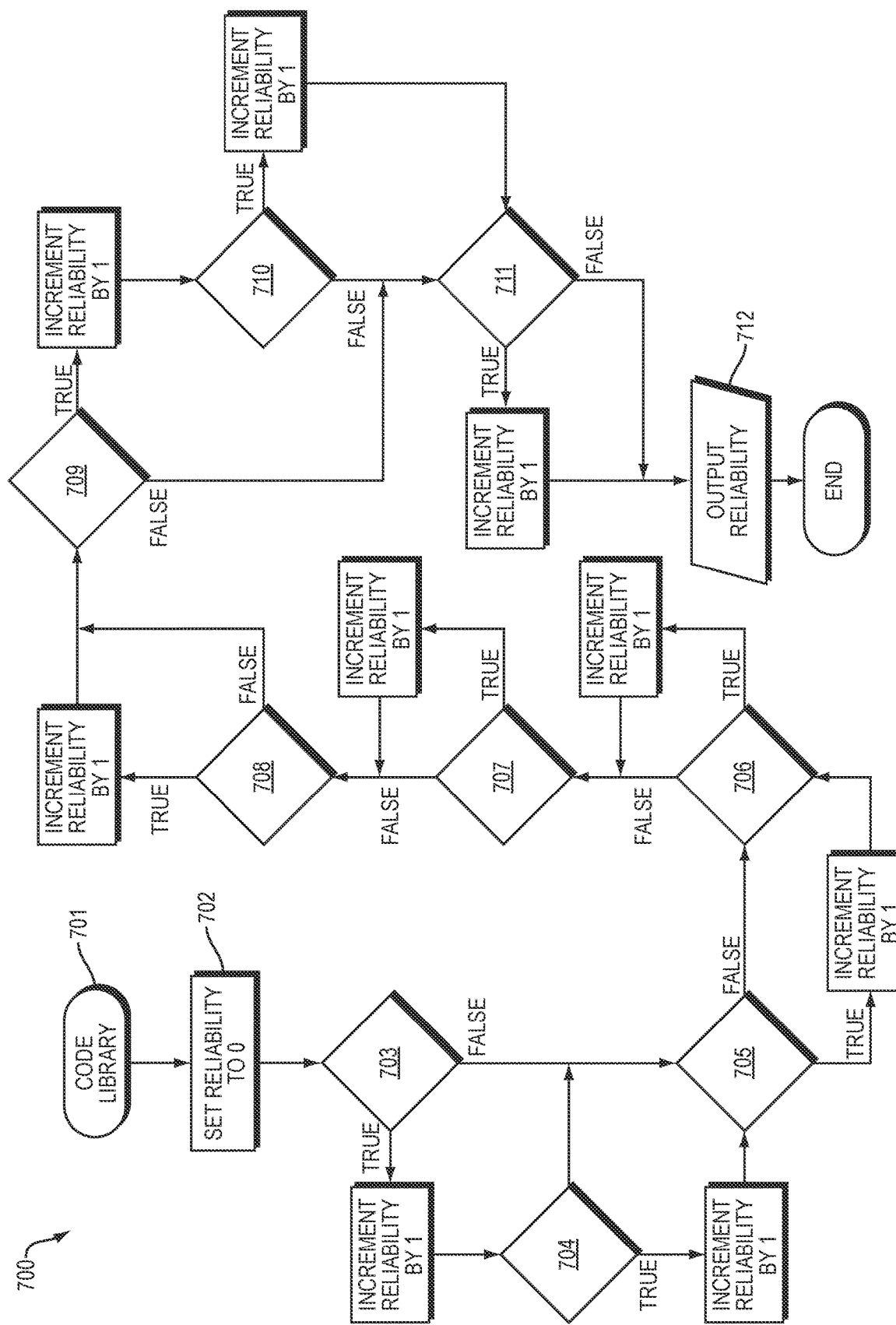
FIG. 7 shows a flowchart of analysis and recommendations by the recommendation engine of FIGS. 1 and 4.

The components 460A . . . 460F (460 generally) provide input to the recommendation engine for use in applying the analysis logic 432, discussed further below in FIG. 7.

Together these components provide detailed access to important information that was not accessible in the same place, or required extensive, manual data extraction. By automatically processing this information and collocating it, users can answer questions and analyze risks about using the library that they couldn't before. Collectively, the components 460 address the six risks below by giving us a picture of the contributors, their contributions, their responsiveness, and the technologies used:

1. Single Point of Failure. A software library may have a small number of primary contributors for the project, or a small number of primary contributors for important functionality. This results in a single point of failure. The project is at risk of not being maintained if those contributors leave the project.

2. Unresponsive to Community. Are the library developers unresponsive to feature requests or bug reports from the community? Then the library users may have to perform extra work to patch the library for their own needs.

3. Low Ratio of Contributors to Project Size. Large projects with few contributors may be more likely to have components or features that are not being actively maintained. Or the library developers may be less responsive to feature requests or bug reports from community members.

4. Inactive Developers. Projects with inactive developers are less likely to be maintained. This results in less responsiveness to community requests and fewer releases of new library versions.

5. Project Decline. Due to technological advancement and changes in the library developers, older projects are more likely to become outdated, deprecated, or inactive.

6. Unsuitable Technology. The library could use a technology, such as a programming language or database, that is unfamiliar to you. This increases the effort needed to use the library and increases the risk that you may not be able to use the library to its full extent. Alternatively, the library could use another library or technology that is at risk of becoming outdated, deprecated, or inactive, thereby posing a risk to the library being considered.

Periodically, or upon a request for a recommendation, the recommendation engine 430 queries the history 424 database and issues database 426, processes the data, and then returns the resulting data a particular library. Computing the components for a library 150 performs two primary operations. The first is to aggregate the commit data from the module stats 414 by author, month, and commit identifier. The second is to calculate the bus factor, which measures the risk to the project in terms of the number of core, or significant contributors. The significant contributor component indicates the fewest committers doing at least half of the work in a given month. It is defined as:

$$\sum_{n=1}^{P} C_n \geq V/2$$

where P is the bus factor, Cn is the number of commits from committer n in the given month (sorted decreasing by number of commits), and V is the total number of commits in the given month. The definition is derived from a risk denoted by the number of developers who's absence or withdrawal would likely compromise the library 150. The repository's issues data 416 is passed directly to the frontend to calculate running totals of the total number of issues and the number of closed issues.

Figure 6:
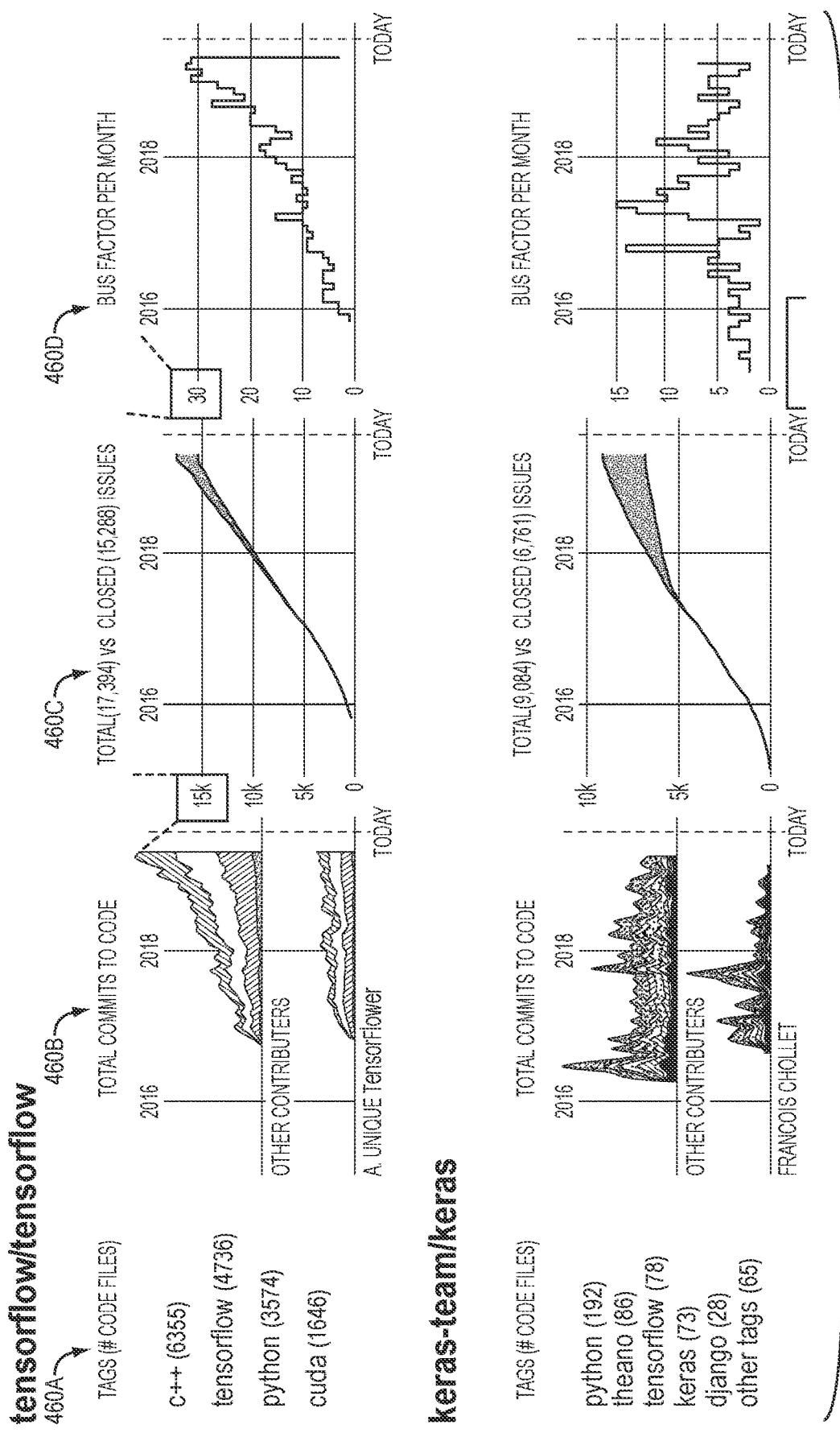
FIG. 6 shows a dashboard of recommendation metrics resulting from analysis logic of FIG. 4.
Figure 6:
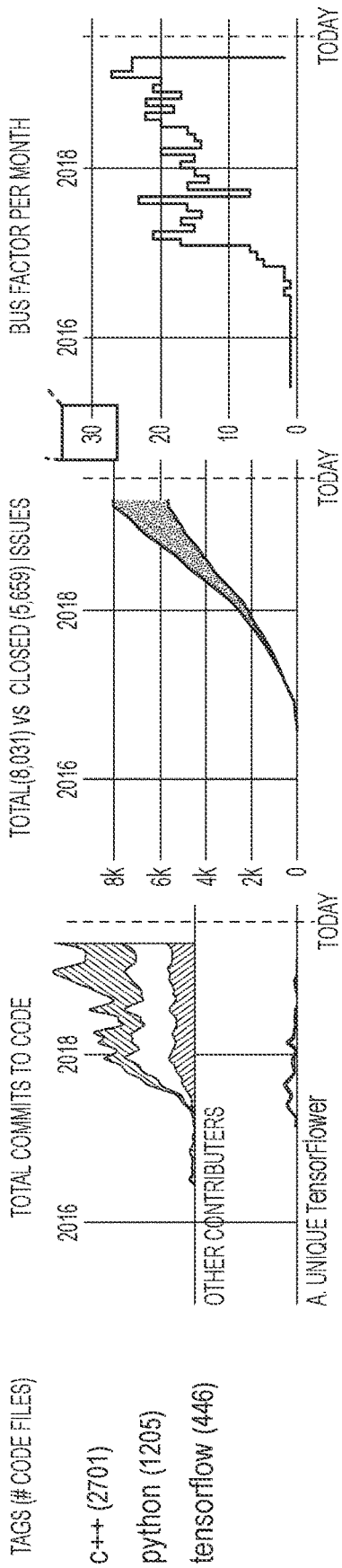
Figure 6:
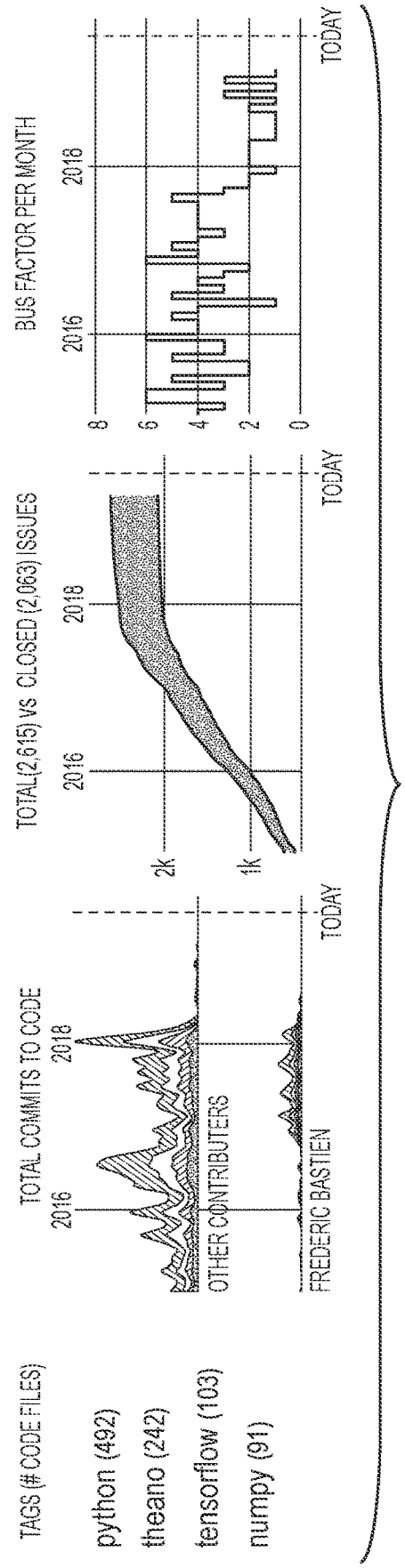

An analysis of the statistics of FIG. 5 provides conclusions and recommendations about each library that may not be apparent from individual metrics alone. FIG. 6 shows a dashboard 600 of recommendations resulting from analysis logic of FIG. 4. Referring to FIGS. 5 and 6, FIG. 6 presents a library comparison dashboard comparing multiple code libraries 150-N by rendering risk components 460 side by side and proposing conclusions and recommendations 470 from these components 460, discussed further in FIG. 7. The tags component 460A is a visual representation of the tags generated for the files from the library. It presents the most common tags as well as the number of code files per tag. This provides insight to two major questions: "What is in this repository?" and "What technologies are used in this project?" Additionally, the tags inform users of the number of code files with different content in this project. This addresses a recommendation of required skills, particular with respect to tags indicating a source language. This component serves as context and background knowledge for the other components and it also serves as a legend for the total commits 512 area plot.

The total commits component 460B provides useful information about the number of commits and the commit content over time. This component shows two area charts of monthly commits, where each layer is colored by tag, showing how the content of commits has changed over time. This supports conclusions about code change quantity and an age of the project). One of the two area charts is the contributor with the most total commits 514, which may correlate with the bus factor as denoting at least one of the significant contributors.

The second area chart 512 is an aggregation of all other contributors combined. This shows the relationship between the most prolific contributor, who is often the lead developer, and the rest of the contributors. Additionally, the relationship between top and other contributors can indicate how much growth the project has taken on since the first commit. Specifically, if the most prolific contributor is committing much less than the other contributors combined, this indicates the project has exited an initial stage of development and now has a healthy number of contributors. On the other hand, if the top contributor is the only one working on an important section of the code (e.g. the database), then the project would be at risk if the top contributor left the project.

The total vs. closed issues component 460C is a line graph that shows the number of total issues and closed issues at monthly intervals. The cross-hatching area 460E between the lines is the focus of this visualization. This indicates whether or not a project's maintainers are keeping up with development and community requests. This presents possible problems with a backlog of issues.

The bus factor component 460D is presented as a line chart showing the number of contributors responsible for at least half of the commits on monthly intervals. This is calculated using the significant contributors as described above. Any drops in the bus factor from the previous month are represented by color or shading from a continuing or increasing factor. While the total commits 460B chart indicates the total amount of work performed, as measured by the number of commits, the bus factor chart shows us how concentrated this work is among the contributors. An increasing bus factor indicates the project is gaining core developers; declines tend to indicate the project is losing core developers. A bus factor with many dips and spikes may indicate many irregular contributors; a smooth line may indicate more consistency among the top contributors.

The recommendation dashboard 600 is designed to compare a group of similar or related repositories, such as Python machine learning libraries, to compare their content and contributor activity. This enables users to answer questions such as which repository has more active developers, which repository's developers are most responsive to issues, and which repository is most sensitive to core developers leaving the project FIG. 7 shows a flowchart of analysis and recommendations by the recommendation engine of FIGS. 1, 4 and 5. The components 460 computed above enter a heuristic computation applied by the analysis logic 432 based on a selection of one or more libraries 150, as shown in the recommendation sequence 700 of FIG. 7. Referring to FIGS. 1, and 4-7, at step 701, a selection of a code library 150 is received, and a reliability count is initialized, as depicted at step 702. A check is performed, at step 703, to identify if a total number of issues, based on the total issues received 520 vs. those closed 522, has increased more than 5% each of the previous 3 months, and in the 6 months prior to that the total number of issues increased more than 10% each month, the reliability is incremented. This is indicative of a leveling off of anomalies after an initial maturing, thus denoting an "S" curve.

If so, then a further check, at step 704, examines if the number of closed issues 522 has increased more than 5% each of the previous 3 months, and in the 6 months prior to that the number of closed issues increased more than 10% each month. This indicates that a narrowing of the area denoted by component 460F is decreasing, assuaging concerns of a neglected library, and again increases the reliability score by 1.

In either path from step 703, a further check examines if the number of closed issues as a percent of the total number of issues has not decreased more than 2 percentage points for each of the previous 6 months, as disclosed at step 705, and reliability incremented accordingly. Collectively, steps 703-

705 compute the reliability value based on a difference between reports of operational anomalies and closure of operational anomalies, and compute a higher reliability value if the difference is lower.

Since the libraries 150 are not necessarily maintained by a particular corporation or entity in contractual privity with a user, there is no onus or feedback loop to confirm active maintenance, unlike a conventional support contract. Accordingly, it is beneficial to determine if a relatively small number of developers are actively pursuing maintenance and attention to issues. For example, if a single developer is responsible for much of the effort, then the loss of that single person would place the library at risk. This rationale defines the significant contributor factor, colloquially known as the "bus factor" relating to the risk of that single developer becoming suddenly and unavoidably detained, as if being "hit by a bus."

The significant contributor component 460D is invoked to compute a reliability factor by identifying a developer identity corresponding to each commit of a plurality of commits, and identifying, for each identified developer, a count of commits corresponding to that identified developer. The recommendation engine 140 computes a lower reliability value based on an increased risk factor if a smaller number of developer identities are attributable to a larger ratio of the commits to the plurality of commits. A check is performed, at step 706, to identify whether the average bus factor for the past 6 months is not more than 150% of the average bus factor for the past 12 months (bus factor not trending upwards), and the average number of commits to code for the past 6 months is not less than 50% of the average number of commits to code for the past 12 months (commits not trending down). If so, then reliability is increased. Graphically, this would trend as a number of commits not falling out of synch with the number of commits, which could indicate a disproportionate number of commits by a relatively few developers.

At step 707, a comparison is made to determine if the average total commits to code from other contributors for the past 6 months is more than the average total commits to code from other contributors for the past 12 months, based on the commit statistics including components 460B and 460E. This check examines whether the number of commits is made by a decreasing number of contributors, and increases the reliability score accordingly.

If the average total commits to code from the top committer for the past 6 months is more than the average total commits to code from the top committer for the past 12 months, as shown by the check at step 708, then reliability is increased. The conclusion is that developers are not becoming less involved or disinterested. The reflects recommendations based on computing the reliability value by calculating a maximum number of commits made by a common (i.e. the same) developer, and computing the reliability value based on a ratio of the calculated maximum number of commits made by a common developer to a total number of commits. This may also involve computing a count of the developer identity attributable to at least half of the commits defining the plurality of the commits, generally meaning a single developer is performing most of the commits.

A further consideration involves computing the reliability value based on a frequency of commits over a time interval, wherein an increase in the frequency decreases the reliability value in view of a likelihood that frequent changes are addressing a multitude of anomalies, suggesting that anomalies are still being worked out.

At step 709, the average bus factor for the past 6 months is examined to see if it is not less than the average bus factor for the past 12 months, meaning to see if the number of significant contributors is decreasing. If it is not, then reliability is increased. If the average bus factor for the past 12 months is at least 50% higher than the average bus factor for the 12 months prior to that, then the number of significant contributors is increasing, and reliability increases accordingly, as shown at step 710.

A final check involves, at step 711, determining if the per-year average for total commits to code from other contributors, the number of closed issues, and bus factor have all increased for the past 3 years for the library 150 in question. If so, another reliability point is added.

Depending on whether a single library recommendation request is made, or a request of multiple libraries, the incremented reliability recommendation is computed. An individual library reliability recommendation value is at least 5, then the recommendation engine 430 renders a positive recommendation 470 for the library. In the case of multiple libraries 150-N on the dashboard, the recommendation engine ranks the libraries by the respective reliability values, and removing libraries where the reliability score is less than 5. If more than one library has the same score, value, the recommendation engine 430 breaks the tie by ranking older libraries higher, based on a more mature development.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for identifying a reliability of a software library, comprising:
   identifying a package in a commonly available software repository, the package defining an interface of available executable modules based on an application programming interface (API);
   gathering, from a catalog of received developer inputs to the package, recorded events about the package;
   computing, based on the recorded events, a reliability value indicative of a subsequent reliability of the executable modules in the package;

rendering, on a graphical user interface (GUI), an indication of one or more of the executable modules having a high likelihood of reliability based on the computed reliability value;

retrieving, via the interface of available executable modules, one or more of the executable modules, and inserting an API (Application Programming Interface) corresponding to each respective executable module into a compiled software program based on the likelihood of reliability.

2. The method of claim 1 wherein the recorded events include a sequence of commit requests, each commit request of the sequence of commit requests corresponding to a modification to the package, each respective commit request made via a developer interface responsive to the modifications.

3. The method of claim 1 wherein the recorded events include a sequence of reported issues based on the package, each reported issue of the sequence of reported issues received from a developer interface and indicative of an operational anomaly of the package.

4. The method of claim 2 wherein the recorded events include a version history, the version history based on the sequence of commit requests, each commit request defined by a modification to one or more files in the package.

5. The method of claim 4 wherein the version history identifies a sequence of versions of the package, each version of the sequence of versions defining a state of each file in the files in the package at a corresponding time denoted by the version.

6. The method of claim 1 wherein the package takes the form of a plurality of source code modules, each source code module of the plurality of source code modules stored in a renderable file indicative of instructions defined therein, each source code module of the plurality of source code modules responsive to modifications introduced by a developer.

7. The method of claim 1 wherein the recorded events include a time and at least one of commits, developer identity, reports of operational anomalies, and closure of operational anomalies.

8. The method of claim 7 further comprising computing the reliability value based on a frequency of commits over a time interval, wherein an increase in the frequency decreases the reliability value.

9. The method of claim 8 wherein the commits include one or more tags, each tag of the one or more tags defining a property of an executable modules affected by the commits; further comprising:

rendering an indication of tags common to a plurality of the executable modules; and ranking the indicated tags according to a frequency of occurrence.

10. The method of claim 7 further comprising computing the reliability value by calculating a maximum number of commits made by a common developer, and computing the reliability value based on a ratio of the calculated maximum number of commits made by a common developer to a total number of commits.

11. The method of claim 7 further comprising computing the reliability value based on a difference between reports of operational anomalies and closure of operational anomalies, and computing a higher reliability value if the difference is lower.

12. The method of claim 7 further comprising computing a reliability factor by identifying a developer identity corresponding to each commit of a plurality of commits;

identifying, for each identified developer, a count of commits corresponding to that identified developer; and computing a lower reliability value based on an increased risk factor if a smaller number of developer identities are attributable to a larger ratio of the commits to the plurality of commits.

13. The method of claim 12 further comprising computing a count of the developer identity attributable to at least half of the commits defining the plurality of the commits.

14. A recommendation engine for computing and rendering a reliability score of a software library, comprising:

an interface to one or more packages in a commonly available software repository, the package defining an interface of available executable modules based on an application programming interface (API);

a database for storing, from a catalog of received developer inputs to the package, recorded events about the package received from the interface;

analysis logic for computing, based on the recorded events, a reliability value indicative of a subsequent reliability of the executable modules in the package;

a Graphical User Interface (GUI) for receiving and rendering, on a graphical user interface (GUI), an indication of one or more of the executable modules having a high likelihood of reliability based on the computed reliability value; and a developer interface configured to:
retrieve, via the interface of available executable modules, one or more of the executable modules, and
insert an API (Application Programming Interface) corresponding to each respective executable module into a compiled software program based on the likelihood of reliability.

15. The device of claim 14 wherein the recorded events include a sequence of commit requests, each commit request of the sequence of commit requests corresponding to a modification to the package, each respective commit request made via a developer interface responsive to the modifications.

16. The device of claim 14 wherein the recorded events include a sequence of reported issues based on the package, each reported issue of the sequence of reported issues received from a developer interface and indicative of an operational anomaly of the package.

17. The device of claim 15 wherein the database further comprises a history database, the recorded events including a version history, the version history based on the sequence of commit requests, each commit request defined by a modification to one or more files in the package.

18. The device of claim 17 wherein the version history identifies a sequence of versions of the package, each version of the sequence of versions defining a state of each file in the files in the package at a corresponding time denoted by the version.

19. The device of claim 13 wherein the package takes the form of a plurality of source code modules, each source code module of the plurality of source code modules stored in a renderable file indicative of instructions defined therein, each source code module of the plurality of source code modules responsive to modifications introduced by a developer.

20. A computer program product including a non-transitory medium comprising program code defined by a sequence of instructions stored thereon that, when executed by a processor, performs steps for implementing a method for computing a reliability of a software library, the method comprising:

identifying a package in a commonly available software repository, the package defining an interface of available executable modules based on an application programming interface (API);

gathering, from a catalog of received developer inputs to the package, recorded events about the package;

computing, based on the recorded events, a reliability value indicative of a subsequent reliability of the executable modules in the package;

rendering, on a graphical user interface (GUI), an indication of one or more of the executable modules having a high likelihood of reliability based on the computed reliability value;

retrieving, via the interface of available executable modules one or more of the executable modules, and inserting an API (Application Programming Interface corresponding to each respective executable module into a compiled software program based on the likelihood of reliability.

\* \* \* \* \*